Sept. 24, 1963  R. H. CHAMERLIN ETAL  3,104,960
GAS FLOW APPARATUS
Filed May 24, 1960
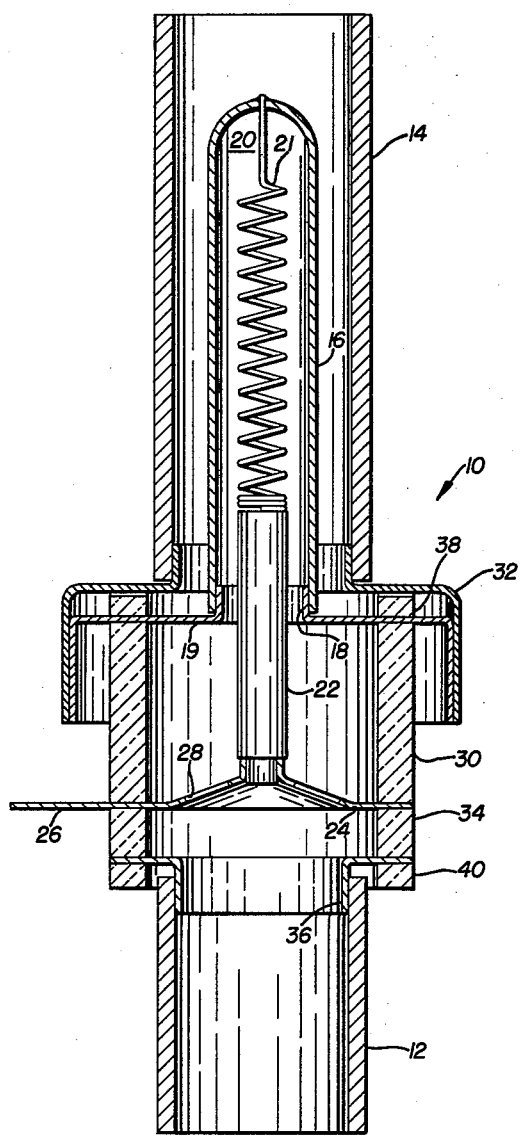
INVENTORS
RICHARD H. CHAMBERLIN
LOWELL A. NOBLE
BY WILLIAM H. SAIN
*Leon F. Herbert*
*Robert W. Delta*
ATTORNEYS United States Patent Office 3,104,960
Patented Sept. 24, 1963

3,104,960
GAS FLOW APPARATUS
Richard H. Chamberlin, San Bruno, Lowell A. Noble, Hillsborough, and William H. Sain, Belmont, Calif., assignors to Eitel-McCullough, Inc., San Carlos, Calif., a corporation of California
Filed May 24, 1960, Ser. No. 31,375
6 Claims. (Cl. 55—158)

This invention relates to a gas flow apparatus for controlling the flow and purity of gases.

In many processes, a system must be filled with a pure gas at a given pressure; or a pure gas must flow into the system at a steady, easily controllable rate. This is accomplished neatly and simply by diffusing the gas through a semipermeable membrane. Hydrogen is known to diffuse through a semipermeable membrane made of nickel, platinum, molybdenum, copper, iron, aluminum, palladium, or silicon dioxide; oxygen is known to diffuse through a membrane made of silver, nickel, or copper; nitrogen is known to diffuse through a membrane made of molybdenum, iron, or chromium; carbon monoxide is known to diffuse through a membrane made of iron or nickel; helium and neon are known to diffuse through a membrane of fused-quartz, etc. The diffusion rate is accelerated at elevated temperatures.

An object of this invention is to provide an improved structure for a gas flow apparatus.

Another object of this invention is to provide an efficient gas flow apparatus.

Yet another object of this invention is to provide a rugged, durable ceramic gas flow apparatus.

In terms of broad inclusion, the invention comprises a tubular semipermeable membrane closed at one end, disposed coaxially within a tube, and sealed continuously to the wall of the tube at the periphery of the open end of the membrane; and a heating element is disposed within the tubular semipermeable membrane.

This invention possesses other objects and features of advantage, some of which, with the foregoing, will be set forth in the following description of the invention. The invention is not limited to the disclosed embodiment but includes variant embodiments thereof within the scope of the claims.

Referring to the drawing, in which the single FIGURE shows the improved gas flow apparatus in cross-section, there is shown an external tubular envelope 10 in which a gas is supplied under pressure through a high pressure tube 12, and the gas exhausts through a low pressure tube 14, normally connected to an evacuated system to be filled with the gas. As will be obvious to those skilled in the art, tubes 12 and 14 provide a convenient means of attaching the apparatus in a gas flow system by clamping or welding to the ends of tubes 12 and 14.

A tubular semipermeable membrane 16 is closed at one end and bonded at its open end to the periphery of an aperture 18 formed in a transverse wall 19. Thus, members 16 and 19 form a partition which separates the gas at high pressure in tube 12 from the gas at low pressure in tube 14. The wall 16 of this partition forms a chamber 20 which is open only to the high pressure or inlet end of the apparatus. The wall 19 extends through structure 10 to form a sealing ring for the apparatus. Since this is a gas flow apparatus, the membrane 16 is permeable to the particular gas in use and not permeable to other gases. Thus, the membrane 16 is termed a semipermeable membrane since it is selective in the gases which pass through it.

A hydrogen flow apparatus is explained in this embodiment of the invention. Therefore, the material of which each part is made is particularly useful in constructing hydrogen flow apparatus. Of course, one skilled in the art can readily substitute other materials whereby other gases may be accommodated by the novel structure.

Since the temperature of the membrane controls the diffusion rate through the membrane 16, which in this embodiment is made of palladium, heat must be applied to the membrane in order to control the flow. In order to make an efficient, rugged gas flow apparatus, a filament 21 is disposed in the chamber 20 within the membrane, as shown. The filament is supported at both ends for rigidity. Since the filament is disposed within the membrane, the membrane is heated by convection and radiation but cooled primarily by radiation alone, because the gas on the outside of the membrane forms a low pressure atmosphere or partial vacuum, whereas the gas on the inside of the membrane is at relatively high pressure. Thus, the membrane 16 can be brought up to temperature quickly and the desired temperature maintained with minimum electrical power consumption.

As an alternative, the filament 21 may be a "hairpin" type with both leads (instead of only one lead) extending through the open end of the membrane 16. But, in order to produce the more rugged construction, one end of the filament 21, which is tungsten, is suitably brazed and preferably gold-brazed to the closed end of the membrane. The other end of the filament is mounted on a metallic post 22 which is, in turn, mounted on the apex of a flanged, conical metallic terminal ring 24 which forms electric lead-through means for conducting current to one end of the filament. The ring 24 has apertures 28 for the passage of hydrogen therethrough and is provided with an external terminal tab 26. Post 22 has a reduced diameter at its lower end so that it can be inserted in the ring 24 and rigidly brazed in place.

The filament is, of course, heated by electricity. Therefore, suitable insulators are needed in the apparatus. A tubular ceramic insulator 30, forming part of the envelope, is bonded at one end to sealing ring 19 and at the other end to terminal ring 24. The sealing ring 19 is arc-welded to a metal sealing ring 32 which is brazed to the end of the low-pressure tube 14. Leads from a suitable power supply (not shown) are connected to sealing ring 32 and tab 26 in order to heat the filament. As mentioned above, tube 14 is normally connected to the system to be filled with gas. This arrangement normally places sealing ring 32 at ground potential, as the system and tube 14 are preferably made of metal and are grounded. The high-pressure tube 12 is bonded to one end of a ceramic ring insulator 34 which forms a part of the envelope wall and is brazed to the terminal ring 24 at its other end. Since insulator 34 can separate a potential difference between the tube 12 and the terminal ring 24, the tube 12 can be at ground potential the same as tube 14, providing a safer and more economical construction than if tube 12 were brazed directly to terminal ring 24. Otherwise, tube 12 must be made of an insulating material or means must be provided around tube 12 and a high-pressure gas supply (not shown) which is connected to tube 12 to protect persons in the immediate area and prevent shorting of the power supply. A suitable sealing ring 36 is brazed to the end of the tube 14 to facilitate the bonding of the tube to insulator 34. The ceramic insulators 30 and 34, of course, serve as parts of the envelope wall for the device. Ceramic backing rings 38 and 40 reinforce the ceramic-to-metal bond between sealing ring 19 and insulator 30, and between sealing ring 36 and insulator 34, respectively. Insulators 30 and 34 mutually reinforce the ceramic-to-metal bonds between insulator 30 and terminal ring 24, and between insulator 34 and terminal ring 24. The bonds between the various ceramic and metal members are made in a conventional manner by first metalizing the bond area on the ceramic and then brazing the metal member to the metalized areas on the ceramics.

As explained, tube 12 forms a convenient means for attaching the apparatus to a high-pressure gas supply, and tube 14 forms a convenient means for attaching the apparatus to a system which requires pure gas at a controlled rate. Tube 14 serves the additional function of protecting membrane 16 from damage prior to insertion of the apparatus in a gas flow system. However, it will be apparent that the efficient heating feature of the apparatus can be retained even if tubes 12 and 14 are dispensed with as part of the apparatus per se and the gas flow system is attached directly to ring 36 and to ring 32 or ring 19.

We claim:

1. A gas flow apparatus comprising a tubular semipermeable membrane closed at one end and disposed in an envelope having two apertures, said envelope forming a continuous open passage from each of said apertures to the adjacent side of said membrane, the wall of said envelope being entirely closed except for said two apertures, an apertured wall in said envelope disposed between the two apertures in said envelope, said membrane being bonded by its open end to the periphery of the aperture in said wall, a filament disposed within said membrane, said filament having one end connected to said membrane at the closed end thereof, and electric lead-through means disposed through said envelope and connected to the other end of said filament.

2. A gas flow apparatus comprising an envelope, a tubular semipermeable membrane closed at one end and disposed within said envelope, a filament disposed within said membrane, a ceramic envelope ring having a first metal ring sealed at one end thereof and having a second metal ring sealed at the other end thereof, a first tube sealed by one end to said first metal ring and axially aligned with said ceramic ring, and a second tube sealed by one end to said second ring and axially aligned with said ceramic ring, said membrane having the rim of its open end sealed to the inner periphery of said first metal ring, one end of said filament being electrically connected to said second metal ring and the other end being electrically connected to said first metal ring.

3. A gas flow apparatus comprising an envelope, a tubular semipermeable membrane closed at one end and disposed within said envelope, a filament disposed within said membrane, a ceramic envelope ring having a first metal ring sealed at one end thereof and having a second metal ring sealed at the other end thereof, a first tube sealed by one end to said first metal ring and axially aligned with said ceramic ring, and a second tube sealed by one end to said second ring and axially aligned with said ceramic ring, said membrane having the rim of its open end sealed to the inner periphery of said first metal ring, one end of said filament being connected to the closed end of said membrane, the other end of said filament being connected to an axially disposed rod sealed to the inner periphery of said second metal ring, and said second metal ring having an aperture disposed between said rod and said ceramic ring.

4. A gas flow apparatus comprising an envelope, a tubular semipermeable membrane closed at one end and disposed within said envelope, a filament disposed within said membrane, a first ceramic envelope ring having a first metal ring sealed at one end thereof and having a second metal ring sealed at the other end thereof, a first tube sealed by one end to said first metal ring, a second ceramic envelope ring sealed at one end to said second metal ring, and a second tube sealed at the other end of said second ceramic ring, said membrane having the rim of its open end sealed to the inner periphery of said first metal ring, one end of said filament being electrically connected to said second metal ring and the other end being electrically connected to said first metal ring.

5. A gas flow apparatus comprising an envelope, a tubular semipermeable membrane closed at one end and disposed within said envelope, a filament disposed within said membrane, a first ceramic envelope ring having a first metal ring sealed at one end thereof and having a second metal ring sealed at the other end thereof, a first tube sealed by one end to said first metal ring, a second ceramic envelope ring sealed at one end to said second metal ring, a second tube sealed at the other end of said second ceramic ring, and an axially disposed rod fixed to the inner periphery of said second metal ring, said membrane having the rim of its open end sealed to the inner periphery of said first metal ring, one end of said filament being connected to the closed end of said membrane, the other end of said filament being connected to said rod, and said second metal ring having an aperture disposed between said rod and said ceramic ring.

6. A gas flow apparatus comprising an envelope, a tubular semipermeable membrane closed at one end and disposed within said envelope, a filament disposed within said membrane, a first ceramic envelope ring having a first metal ring sealed at one end thereof and having a second metal ring sealed at the other end thereof, a second ceramic envelope ring sealed at one end to said second metal ring, a third metal ring sealed to the other end of said second ceramic ring, a first metal tube having at one end a sealing ring attached to said first metal ring, said membrane being sealed by its open end to the inner periphery of said first metal ring and projecting into said first tube with the closed end of the membrane terminating inside said first tube, a metal rod fixed to the inner periphery of said second metal ring, said metal rod extending toward the open end of said membrane, said second metal ring having an aperture disposed between said metal rod and the envelope, one end of said filament being fixed to said rod and the other end of said filament being fixed to the closed end of said membrane, and a second tube having one end sealed to said third metal ring.

References Cited in the file of this patent

UNITED STATES PATENTS

| | | |
|---|---|---|
| 2,255,069 | Maier | Sept. 9, 1941 |
| 2,456,163 | Watson | Dec. 14, 1948 |
| 2,671,337 | Hulsberg | Mar. 9, 1954 |
| 2,911,057 | Green et al. | Nov. 3, 1959 |
| 2,924,630 | Fleck et al. | Feb. 9, 1960 |
| 2,986,641 | Michels | May 30, 1961 |